United States Patent
Chiba

(10) Patent No.: US 8,700,240 B2
(45) Date of Patent: Apr. 15, 2014

(54) START CONTROL SYSTEM FOR VEHICLE

(75) Inventor: Kunihiko Chiba, Kuwana (JP)

(73) Assignee: Denso Corporation, Kariya (JP)

( * ) Notice: Subject to any disclaimer, the term of this patent is extended or adjusted under 35 U.S.C. 154(b) by 436 days.

(21) Appl. No.: 13/199,669

(22) Filed: Sep. 7, 2011

(65) Prior Publication Data

US 2012/0059541 A1    Mar. 8, 2012

(30) Foreign Application Priority Data

Sep. 8, 2010  (JP) ................................ 2010-201313

(51) Int. Cl.
*B60L 3/08*    (2006.01)
*B60L 15/10*   (2006.01)
*B60W 30/18*   (2012.01)

(52) U.S. Cl.
CPC . *B60L 3/08* (2013.01); *B60L 15/10* (2013.01); *B60W 30/18027* (2013.01)
USPC ............................................. 701/22; 701/70

(58) Field of Classification Search
USPC .......................................................... 701/22
See application file for complete search history.

(56) References Cited

U.S. PATENT DOCUMENTS

| | | | | | |
|---|---|---|---|---|---|
| 2,973,050 | A | * | 2/1961 | Bennett | 180/286 |
| 5,864,771 | A | * | 1/1999 | Yokoyama et al. | 701/51 |
| 6,007,451 | A | | 12/1999 | Matsui et al. | |
| 2002/0116100 | A1 | * | 8/2002 | Shimazaki et al. | 701/22 |
| 2004/0000444 | A1 | * | 1/2004 | Watanabe | 180/271 |
| 2006/0060162 | A1 | * | 3/2006 | Fukui et al. | 123/179.16 |
| 2010/0023234 | A1 | * | 1/2010 | Kameyama | 701/70 |
| 2011/0307155 | A1 | * | 12/2011 | Simard | 701/93 |

FOREIGN PATENT DOCUMENTS

| | | |
|---|---|---|
| JP | 57-072702 | 5/1982 |
| JP | 1-121524 | 5/1989 |
| JP | 3-194132 | 8/1991 |
| JP | 4-058027 | 2/1992 |
| JP | 6-071252 | 10/1994 |
| JP | 6-328970 | 11/1994 |
| JP | 6-340231 | 12/1994 |
| JP | 7-246858 | 9/1995 |
| JP | 09-286252 | 11/1997 |

(Continued)

OTHER PUBLICATIONS

Office Action issued Aug. 21, 2012 in corresponding Japanese Application No. 2010-201313 with English translation.

*Primary Examiner* — Thomas Tarcza
*Assistant Examiner* — Shelley Chen
(74) *Attorney, Agent, or Firm* — Harness, Dickey & Pierce, PLC

(57) ABSTRACT

A start control system for an automotive vehicle equipped with an electric motor working as a drive source. The start control system includes an accelerator limiter which limits an operating range of an accelerator of the vehicle to disable the electric motor and a limitation cancelling request receiver that receives a limitation cancelling request from a vehicle operator to cancel the limitation of the operating range of the accelerator. When the vehicle operator makes a start request mistakenly, so that the condition where the electric motor is set ready to start coincides with the condition where a brake of the vehicle is not operated, which will cause the vehicle to start upon the movement of the accelerator, the vehicle is inhibited from running unless the limitation cancelling request receiver receives the limitation cancelling request, thus minimizing the possibility of an error in starting the vehicle.

9 Claims, 6 Drawing Sheets

(56) References Cited

FOREIGN PATENT DOCUMENTS

| JP | 10-122350 | 5/1998 |
|----|-----------|--------|
| JP | 3059551 | 4/2000 |
| JP | 2004-243950 | 9/2004 |
| JP | 2004-280489 | 10/2004 |
| JP | 2006-248311 | 9/2006 |

* cited by examiner

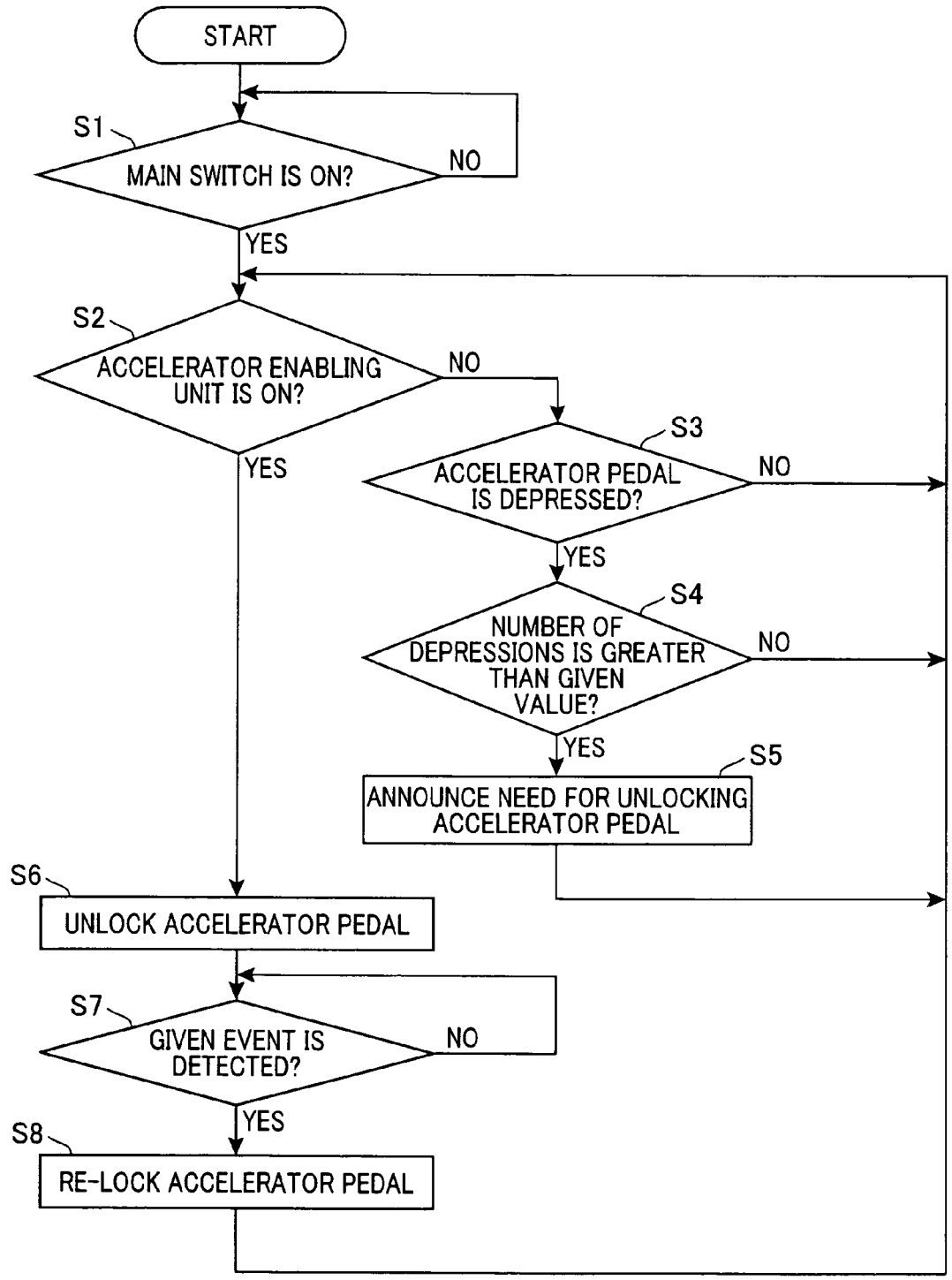

START CONTROL SYSTEM FOR VEHICLE

CROSS REFERENCE TO RELATED DOCUMENT

The present application claims the benefit of priority of Japanese Patent Application No. 2010-201313 filed on Sep. 8, 2010, the disclosure of which is incorporated herein by reference.

BACKGROUND OF THE INVENTION

1. Technical Field

The present invention relates generally to an automatic start control system for automotive vehicles which is designed to control starting of the vehicle.

2. Background Art

In recent years, hybrid vehicles equipped with a combination of an internal combustion engine and an electric motor as a power source or electric vehicles equipped with only an electric motor as a power source have being increasing instead of typical engine-powered vehicles using only the internal combustion engine as a power source.

When a vehicle operator or driver has turned on a start key or button to start the internal combustion engine, the driver usually can hear the sound from or feel mechanical vibrations of the internal combustion engine within a cabin of the vehicle to perceive the fact that the engine has started. However, the electric motors are almost noiseless, so that it is difficult for the driver within the electric vehicle to recognize the fact that the vehicle is ready to run.

The engine-powered vehicles are usually equipped with a four-position key switch or a four-position switch with an off-position, an accessory (ACC) position to supply power to electric accessories, an on-position to energize an igniter for the engine, and a start position to actuate a starter for the engine, while the electric vehicles need not start the engine and are equipped with, for example, a three-position switch with the off-position, the ACC position, and the on-position to energize an inverter for driving the electric motor.

As described above, the electric vehicles are quieter than the engine-powered vehicles and also different in number of the switch positions from each other. Therefore, when getting into the electric vehicle, the driver who is used to the engine-powered vehicle may misperceive that the vehicle is not yet ready to run and take action improperly to start the vehicle.

For example, two-wheeled electric vehicles need not start the engine and are usually made ready to start only by inserting a key into the key switch and turning it to the on-position. Two-wheeled engine-powered vehicles equipped with internal combustion engines as the power source enable the driver to perceive with the sound from or mechanical vibrations of the internal combustion engine the fact that the vehicle is ready to start, but with the two-wheeled electric vehicles the driver cannot. Thus, when the driver who is on the two-wheeled electric vehicle inserts the key into the key switch, turns it to the on-position, and then grabs the accelerator lever like operations on the two-wheeled engine-powered vehicle before starting the engine, it will cause the vehicle to run undesirably.

Japanese Patent First Publication No. 6-328970 teaches an unintended starting prevention system for electric scooters which prevents an electric motor from starting unless the scooter is braked. Specifically, the unintended starting prevention system turns on a relay which connects a motor controller and a rotary throttle working as an accelerator when a logic circuit detects at least a signal indicating that the brake is actuated and stops the scooter from starting even if the throttle is actuated unless the brake is applied to the scooter.

The electric vehicles which are different in type of the key switch from the engine-powered vehicles have the possibility that the driver shifts the key to the start position and depresses the accelerator pedal unintentionally to start the vehicle under the impression that the vehicle is not yet ready to run.

The typical hybrid vehicles are usually equipped with a power switch which has three power positions (i.e., the off-position, the ACC position, and the on-position) and a motor start position to start the electric motor. The hybrid vehicles are designed to start the electric motor only when the power switch is pressed while the brake pedal is depressed. Some of the hybrid vehicles are engineered to turn on an indicator lamp when the vehicle has become ready to run for informing the driver of such a fact visually.

The unintended starting prevention system, as taught in the above publication, however, faces the problem that when the driver holds the handle bar to move the scooter, but grips the brake lever unintentionally, the scooter will be made ready to start undesirably, which causes the scooter to start to run when the driver grips the accelerator lever while under the impression that the scooter is not yet ready to run.

The unintended starting prevention system also encounters the drawback in that the driver can't know whether the scooter is ready to start or not unless the driver operates the accelerator bar actually and thus has the possibility that the driver has started the scooter in error.

The hybrid vehicles also have the problem that when the driver who is unused to handling the hybrid vehicle pushes the power switch to change the power position while checking the location or position of the brake pedal or without knowing that he or she is touching the brake pedal, the vehicle will be ready to run, which creates the possibility that when the driver checks the location or position of the accelerator pedal or depresses it carelessly under the impression that the vehicle is not yet ready to start, the vehicle starts to run.

Some of the hybrid vehicles are equipped with an indicator lamp which indicates whether the vehicle is now ready to run or not. The possibility that the driver checks the indicator lamp intentionally is, however, low if the driver mistakenly believes that the vehicle is not yet ready to run, which may cause the driver to start the vehicle unintentionally.

SUMMARY OF THE INVENTION

It is therefore an object to provide a start control system for electric vehicles which is designed to avoid an unintentional start of the vehicle.

According to one aspect of an embodiment, there is provided a start control apparatus for an electrically-driven vehicle which is equipped with an electric motor working as a drive source of the vehicle, a brake working to brake the vehicle in response to a brake request from a vehicle operator, an accelerator which is to be moved in response to an acceleration request from the vehicle operator to accelerate the vehicle, and a motor driver working to drive the electric motor as a function of movement of the accelerator. The start control apparatus comprises: (a) a start request receiver that receives a start request from the vehicle operator to start the electric motor; (b) an accelerator limiter which limits an operating range in which the accelerator is to be moved by the vehicle operator to disable the electric motor through the motor driver; (c) a limitation cancelling request receiver that receives a limitation cancelling request from the vehicle operator; and (d) a controller that is responsive to the start request, as received by the start request receiver, to make the electric motor ready to start, the controller being also responsive to the limitation cancelling request, as received by the limitation cancelling request receiver, to cancel limitation of the operating range of the accelerator, as established by the accelerator limiter, to enable the accelerator to be moved in response to the acceleration request from the vehicle operator. The limitation cancelling request receiver is provided to be separate from the start request receiver and the brake. Even when the electric motor is ready to start, the controller is inhibited from canceling the limitation of the operating range of the accelerator unless the limitation cancelling request receiver receives the limitation cancelling request from the vehicle operator.

Specifically, even when the vehicle operator inputs the start request to the start request receiver mistakenly, so that the condition where the electric motor is set ready to start coincides with the condition where the brake is not operated, which will cause the vehicle to start upon the movement of the accelerator, the vehicle is inhibited from running unless the limitation cancelling request receiver receives the limitation cancelling request from the vehicle operator. In other words, the start control apparatus is designed to produce additional action which the vehicle operator needs to take to start the vehicle, thus minimizing the possibility of an error in starting the vehicle.

The start control apparatus keeps the accelerator disabled by accelerator limiter unless the vehicle operator inputs the limitation cancelling request into the limitation cancelling request receiver with the intention to start the vehicle. In other words, the start control apparatus allows the vehicle operator to easily know whether the vehicle is ready to start or not.

In the preferred mode of the embodiment, the limitation cancelling request receiver, the start request receiver, the brake, and the accelerator are provided to be separate from each other and disposed at different locations which make the vehicle operator impossible to operate the limitation cancelling request receiver, the start request receiver, the brake, and the accelerator simultaneously using one hand or one foot. This minimizes the possibility that the vehicle operator inputs the limitation canceling request into the limitation canceling request receiver in error while the start request receiver, the brake, and/or the accelerator are being operated.

The electrically-driven vehicle may be equipped with a gear shifter which is operated manually by the vehicle operator to shift a gear ratio of the electrically-driven vehicle. In this case, the limitation cancelling request receiver, the start request receiver, the brake, the accelerator, and the gear shifter are preferably provided to be separate from each other and disposed at different locations which make the vehicle operator impossible to operate the limitation cancelling request receiver, the start request receiver, the brake, the accelerator, and the gear shifter simultaneously using one hand or one foot. This also minimizes the possibility that the vehicle operator inputs the limitation canceling request into the limitation canceling request receiver in error while the start request receiver, the brake, the accelerator, and/or the gear shifter are being operated.

When a given event is detected after the limitation of the operating range of the accelerator, as established by the accelerator limiter, is cancelled, the controller limits the operating range of the accelerator again through the accelerator limiter.

For example, in the case where the electrically-driven vehicle is equipped with a gear shifter which is operated manually by the vehicle operator to shift a gear ratio of a transmission mounted in the electrically-driven vehicle, the start control apparatus may also include a shift position sensor which senses a position of the gear shifter. When the position of the gear shifter, as sensed by the shift position sensor, is kept in one of a parking position and a neutral position for a given period of time, the controller may determine that the given event has been detected and then limit the operating range of the accelerator again through the accelerator limiter. Specifically, when the gear shifter is kept in the parking or neutral position, there is a high possibility that the vehicle is kept stopped or parked over a common period of time for which the vehicle usually waits for the traffic light to change. Therefore, in such an event, the controller preferably limits the operating range of the accelerator to disable the electric motor, thereby avoiding an unintended starting of the vehicle.

The start control apparatus may also include a seat sensor which sensors the vehicle operator on a driver's seat of the electrically-driven vehicle. When the vehicle operator is determined by the seat sensor as not being sitting on the operator's seat, the controller may determine that the given event has been detected and then limit the operating range of the accelerator again through the accelerator limiter. When the operator's seat is not occupied by the vehicle operator, there is a high possibility that the vehicle is kept stopped or parked over the common period of time for which the vehicle usually waits for the traffic light to change. Therefore, in such an event, the controller preferably limits the operating range of the accelerator to disable the electric motor, thereby avoiding an unintended starting of the vehicle.

When it is found that the electric motor is stopped and not ready to start, the controller may also determine that the given event has been detected and then limit the operating range of the accelerator again through the accelerator limiter. Specifically, when the electric motor is stopped and not ready to start, there is a high possibility that the vehicle is kept stopped or parked over the common period of time for which the vehicle usually waits for the traffic light to change. Therefore, in such an event, the controller preferably limits the operating range of the accelerator to disable the electric motor, thereby avoiding an unintended starting of the vehicle.

The accelerator may be so designed that when moved by the vehicle operator over a given amount, the accelerator works to accelerate the electric motor. The accelerator limiter mechanically holds the accelerator from being moved over the given amount to disenable the electric motor. In other words, the controller has a dead zone within which the controller is insensitive to the movement of the accelerator until the movement of the accelerator exceeds the given amount.

The start control apparatus may also include an accelerator sensor which sensors the movement of the accelerator and produces an output indicative thereof. The controller monitors the output from the accelerator sensor to determine whether the accelerator has been moved a given number of times or for a given period of time or more. When it is determined that the accelerator has been moved the given number of times or for the given period of time or more, the controller informs the vehicle operator that the limitation of the operating range of the accelerator, as achieved by the accelerator limiter, needs to be cancelled through an announcing device.

When the operating range of the accelerator is limited by the accelerator limiter again without being found by the vehicle operator, the vehicle operator will be informed of the need for cancelling the limitation of the operating range of the accelerator at the time when the vehicle operator operates the accelerator several times or continues to operate it and then enabled to get the vehicle ready to start.

The start control apparatus may also include a brake sensor which senses an operation of the brake. When it is found by the brake sensor that the brake is being operated, and the limitation cancelling request receiver receives the limitation cancelling request, the controller may cancel the limitation of the operating range of the accelerator, as established by the accelerator limiter. In other words, the controller does not cancel the limitation of the operating range of the accelerator unless the limitation canceling request is made while the brake is being operated, thus minimizing the possibility of an error in starting the vehicle.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 4 is a flowchart of a program to be executed by the start control system of FIG. 1 to control a starting operation of an automotive vehicle;

DESCRIPTION OF THE PREFERRED EMBODIMENT

Figure 1:
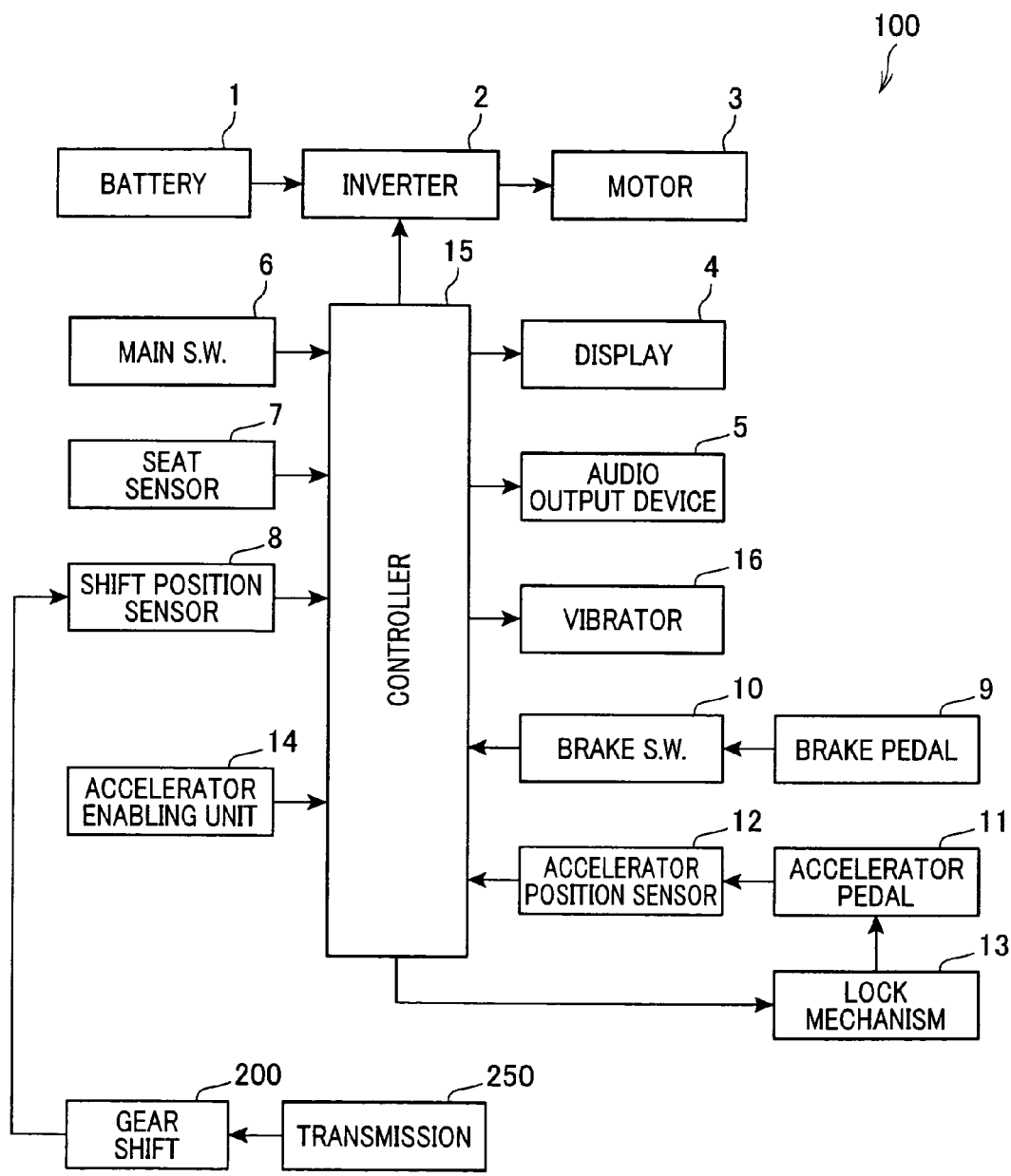
FIG. 1 is a block diagram which illustrates an automatic start control system for automotive vehicles according to an embodiment of the invention.

Referring to the drawings, wherein like reference numbers refer to like parts in several views, particularly to FIG. 1, there is shown a start control system 100 according to an embodiment of the invention which is installed in an electrically-driven vehicle which is equipped with either a combination of an internal combustion engine and an electric motor or only an electric motor as a power source (i.e., a driver source) of the vehicle. The electrically-driven vehicle, as discussed here, may be either a two-wheeled vehicle such as an electric scooter or a four-wheeled vehicle such as an electric hybrid vehicle (EHV). The start control system 100, as referred to herein, is used, as an example, in an electric vehicle equipped with an automatic transmission 250. The electric vehicle in which the start control system 100 is installed will also be referred to as a system vehicle below.

The start control system 10 consists essentially of a storage battery 1, an inverter 2, an electric motor 3, a display 4, an audio output device 5, a main switch 6, a seat sensor 7, a shift position sensor 8, a brake pedal 9, a brake switch 10, an accelerator pedal 11, an accelerator position sensor 12, a lock mechanism 13, an accelerator enabling unit 14, a controller 15, and a vibrator 16. The display 4, the audio output device 5, the seat sensor 7, the shift position sensor 8, the accelerator position sensor 12, the lock mechanism 13, the accelerator enabling unit 14, the controller 15, and the vibrator 16 work as a start control device.

The electric motor 3 is connected electrically to the inverter 2 and the battery 1. The inverter 2 servers as a driver for the motor 3. The motor 3 is supplied with electric power from the battery 1 through the inverter 2 and works as a drive source of the system vehicle. The motor 3 is mechanically connected to the automatic transmission 250 in a conventional manner. The torque, as produced by the motor 3, is outputted to a wheel of the system vehicle (not shown) through the automatic transmission 250.

The display 4 is operable to indicate text files or images and may be implemented by a liquid crystal display, an organic electroluminescence (EL) display, or a plasma display. For example, a display of a car-mounted navigation system or a display installed in an instrument panel of the system vehicle may be used as the display 4.

The audio output device 5 outputs a message in the form of voice or sound and may be implemented by an audio speaker. For example, a speaker of the car-mounted navigation system or a speaker installed in an instrument panel or a cabin of the system vehicle may be used as the audio output device 5.

The vibrator 16 produces a mechanical vibration and may be made using a typical oscillator. The vibrator 16 is installed, for example, in a steering wheel of the system vehicle, so that the vehicle operator or driver may feel the vibration, as produced by the vibrator 16. The vibrator 16 may alternatively be mounted inside the driver's seat so that the driver sitting on the seat may feel the vibration.

The main switch 6 is a switch to set the electric motor 3 ready to start. The condition where the electric motor 3 is ready to start, as referred to herein, represents the condition where the inverter 2 is connected electrically to the battery 1 to place the electric motor 3 in a condition to start running in response to a start signal (i.e., an on-signal) outputted from the controller 15. For example, the main switch 6 is installed in a dashboard of the system vehicle and implemented in this embodiment by a push button such as an alternate switch which is to be changed between an on- and an off-position each time it is depressed.

The main switch 6 may be designed to have an additional accessory on-position to supply the electric power to accessories mounted in the system vehicle.

The main switch 6 may alternatively be installed in a key cylinder, so that it will be turned on upon insertion of a mechanical key into the key cylinder and kept off when the mechanical key is not in the key cylinder. The main switch 6 may also be implemented by a rotary switch which is installed in the key cylinder and to be switched among the on-position, the off-position, and the accessory on-position upon turning of the mechanical key inserted in the key cylinder. The main switch 6 serves as a start request receiver to accept a request, as made by the driver, to start the electric motor 3.

The seat sensor 7 is implemented by a weight sensor and embedded in the driver's seat of the system vehicle. When the driver is on the seat, the seat sensor 7 outputs a signal indicative thereof to the controller 15. The seat sensor 7 may alternatively be implemented by a pressure sensor.

The shift position sensor 8 detects a shift position of a gear shifter 200 (also called a selector lever) of the automatic transmission 250 and outputs a signal indicative thereof to the controller 15. The automatic transmission 250 used in this embodiment is of a typical structure which has a parking (P) position, a reverse (R) position, a neutral (N) position, and a driving (D) position. The automatic transmission 250 may also be engineered to have additional shift positions such as a low (L) position and a B-position which achieves a regenerative braking mode.

The shift position sensor 8 may be engineered to monitor the position of the gear shifter 200 of the automatic transmission 250 or a shift position, as selected by a position switch such as a known P-position switch. The shift position sensor 8, therefore, works as a gear shifting request receiver to receive a request made by the driver to shift or change the gear ratio of the automatic transmission 250.

The brake pedal 9 is a typical brake pedal usually used in automotive vehicles which is to be depressed by the driver to decelerate or stop the system vehicle. The brake switch 10 is an on-off switch which is to be turned on when the brake pedal 9 is depressed. The brake switch 10 functions to determine whether the brake pedal 9 is depressed or not and outputs a signal indicative thereof to the controller 15.

In the case where the start control system 100 is used with the two-wheeled electric vehicle, a brake lever is provided instead of or in addition to the brake pedal 9. The brake switch 10 is turned on when the brake lever is grasped by the driver.

The accelerator pedal 11 works as an accelerator to accelerate the system vehicle (i.e., the electric motor 3). The accelerator position sensor 12 detects an amount by which the accelerator pedal 11 is depressed by the driver, that is, a depressed position of the accelerator pedal 11 and outputs a signal indicative thereof to the controller 15. The accelerator position sensor 12 is implemented by, for example, a stroke sensor.

In the case where the start control system 100 is used with the two-wheeled electric vehicle, an accelerator grip is used instead of the accelerator pedal 11. The accelerator position sensor 12 measures an amount by which the accelerator grip is turned.

The lock mechanism 13 works to lock the accelerator pedal 11 mechanically. In other words, the lock mechanism 13 functions as an accelerator limiter to limit the operation or movement of the accelerator pedal 11 so as to disable the electric motor 3 through the controller 15 and the inverter 2. For example, the lock mechanism 13 may be designed to hold the accelerator pedal 11 from moving completely even when an external pressure is exerted by the driver or limit the stroke of the accelerator pedal 11 to within a given narrow range where the electric motor 3 is not to be actuated. The lock mechanism 13 of this embodiment is engineered to operate in the latter manner.

Figure 2A:
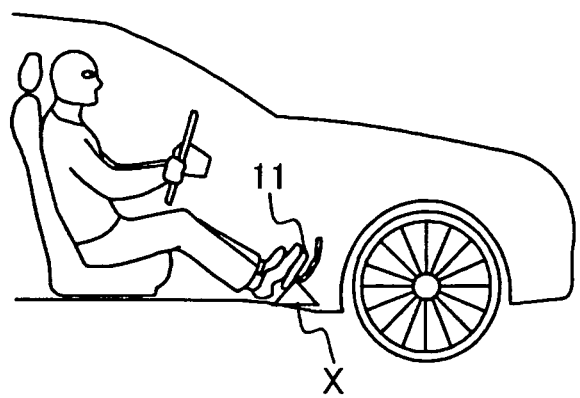
FIGS. 2(a), 2(b), and 2(c) are schematic views which illustrate a structure of a lock mechanism to lock an accelerator pedal of a vehicle.
Figure 2B:
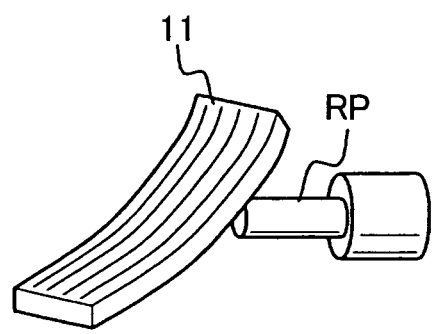
Figure 2C:
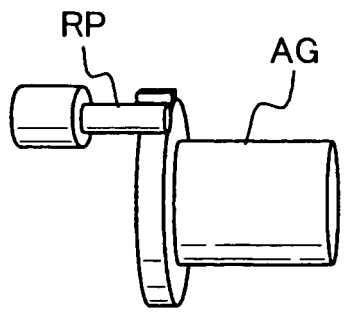

The mechanically locking or limitation of movement of the accelerator pedal 11 is, as illustrated in FIG. 2(*a*), achieved by placing a structural object X behind the accelerator pedal 11 to limit a permissible stroke range of the accelerator pedal 11.

For example, a metallic bar such as a rock pin (RP), as illustrated in FIG. 2(*b*), is interposed between the back of the accelerator pedal 11 and the floor of the system vehicle. The metallic bar may be moved back and forth by a solenoid-operated actuator or a hydraulic actuator to change a range in which the accelerator pedal 11 is permitted to be depressed (i.e., a permissible stroke of the accelerator pedal 11).

The mechanical limitation of stroke of the accelerator pedal 11 may alternatively be achieved by producing a reactive force against the depressed stroke of the accelerator pedal 11 using torque produced by an electric motor.

In the case where the start control system 100 is used with the two-wheeled electric vehicle, the rock pin (RP) may be, as illustrated in FIG. 2(*c*), used to limit a range in which the accelerator grip is permitted to be turned. The limiting of such a range may alternatively be achieved by producing a reactive force against the rotation of the accelerator grip using torque produced by an electric motor.

In the following discussion, it is assumed that the lock mechanism 13 is implemented by the rock pin, as illustrated in FIG. 2(*b*), which is disposed behind the accelerator pedal 11 and controlled in stroke thereof by the electric motor to regulate the limit of the depressed stroke of the accelerator pedal 11.

Referring back to FIG. 1, the accelerator enabling unit 14 is a switch to release the locking of the accelerator pedal 11, as established by the lock mechanism 13. In other words, the accelerator enabling unit 14 servers as a limitation cancelling request receiver which receives a limitation canceling request from the driver to cancel the limitation of the operating range of the accelerator pedal 11, as achieved by the lock mechanism 13. For example, the accelerator enabling unit 14 is implemented by a push-button such as an alternate switch mounted in the dashboard of the system vehicle which is switched by the driver between an on- and an off-state every depression thereof. In the following discussion, it is assumed that the accelerator enabling unit 14 is made of the alternate switch which is installed to be separate from the main switch 6 and the brake pedal 9.

Figure 3A:
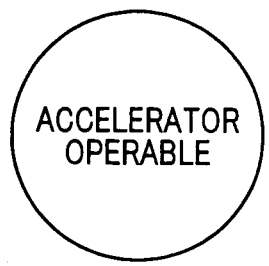
FIGS. 3(a), 3(b), and 3(c) are schematic views which illustrate modified forms of an accelerator enabling unit of the start control system of FIG. 1.
Figure 3B:
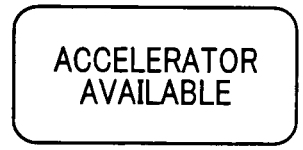
Figure 3C:
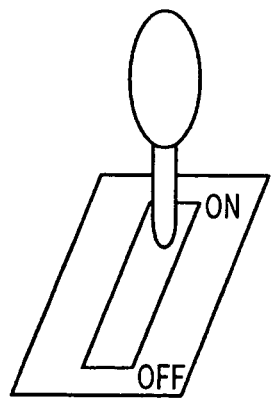

The alternate switch (i.e., the accelerator enabling unit 14) may be, as illustrated in FIG. 3(*a*) or 3(*b*), designed to have a button surface on which "Accelerator Operable" or "Accelerator Available" is printed. When depressed, the alternate switch works to unlock the accelerator pedal 11 to allow it to be operated within an unlimited stroke range.

The accelerator enabling unit 14 may alternatively be, as illustrated in FIG. 3(*c*), made by a lever switch which is slidable between an on- and an off-position.

The controller 15 is made of a typical microcomputer consisting of a CPU, a ROM, a RAM, a back-up RAM, etc. The controller 15 works as an electronic control unit to monitor information, as acquired by the main switch 6, the seat sensor 7, the shift position sensor 8, the brake switch 10, the accelerator position sensor 12, and the accelerator enabling unit 14, and execute control programs, as stored in the ROM, to control an operation of the start control system 100. The controller 15 may alternatively be made of a plurality of electronic control units, one provided for each control task, which communicate electrically with each other.

When an on-signal indicative of the on-state of the main switch 6 is inputted, the controller 15 connects the inverter 2 with the battery 1 to make the motor 3 ready to start.

When the motor 3 has been made ready to start, and the signal inputted from the accelerator position sensor 12 indicates that the accelerator pedal 11 has been depressed, the controller 15 regulates the level of voltage to be outputted from the inverter 2 to the motor 3 as a function of the depressed stroke of the accelerator pedal 11 to control the rotation of the motor 3. In other words, the controller 15 works to control the degree of acceleration of the system vehicle as a function of the depressed stroke of the accelerator pedal 11.

The controller 15 is, however, designed to start driving the motor 3 when the depressed stroke of the accelerator pedal 11 exceeds a given threshold value. In other words, the controller 15 has a dead zone within which the controller 15 is insensitive to the movement of the accelerator pedal 11 until the depressed stroke of the accelerator pedal 11 exceeds the given threshold value. The threshold value may be changed by the controller 15 and is selected to be greater than the permissible amount of stroke of the accelerator pedal 11, as limited by the lock mechanism 13. In other words, the controller 15 is insensitive to the depressed stroke of the accelerator pedal 11 within the range limited by the lock mechanism 13 and does not permit the motor 3 to start.

The controller 15 performs a variety of tasks associated with the locking of the accelerator pedal 11. FIG. 4 is a flowchart of a sequence of logical steps or program to control the locking or limitation of stroke of the accelerator pedal 11. In the following discussion, it is assumed that one of conditions to get the motor 3 ready to start is that a mechanical key is inserted into a key slot (not shown) of the system vehicle.

The program of FIG. 4 is initiated upon insertion of the mechanical key into the key slot and terminated upon removal of the mechanical key from the key slot. In the case where the system vehicle is equipped with a so-called smart entry system or a keyless entry system, the program may alternatively be initiated in response to input of an on-signal from an electronic key.

After entering the program, the routine proceeds to step S1 wherein it is determined whether the main switch 6 is turned on or off. The main switch 6 is designed to output an on-signal indicating an on-state thereof. When the on-signal is inputted, the controller 15 determines that the main switch 6 is in the on-state. When the on-signal is not inputted, the controller 15 determines that the main switch 6 is in the off-state.

If a NO answer is obtained in step S1 meaning that the main switch 6 is in the off-state, the routine repeats the operation of step S1. Alternatively, if a YES answer is obtained, then the routine proceeds to step S2 wherein it is determined whether the accelerator enabling unit 14 is in the on-state or not. The accelerator enabling unit 14 is designed to output an on-signal indicating an on-state thereof. When the on-signal is inputted, the controller 15 determines that the accelerator enabling unit 14 is in the on-state. When the on-signal is not inputted, the controller 15 determines that the accelerator enabling unit 14 is in the off-state.

If a YES answer is obtained in step S2 meaning that the accelerator enabling unit 14 is in the on-state, then the routine proceeds to step S6. Alternatively, if a NO answer is obtained, then the routine proceeds to step S3.

In step S3, it is determined whether the accelerator pedal 11 is depressed or not based on the output from the accelerator position sensor 12. For instance, when the output of the accelerator position sensor 12 indicates that the amount of depressed stroke of the accelerator pedal 11 is greater than zero, the controller 15 determines that the accelerator pedal 11 has been operated.

If a YES answer is obtained in step S3 meaning that the accelerator pedal 11 is depressed, the controller 15 increments a count value which represents the number of times the accelerator pedal 11 has been depressed (which will also be referred to as the number of depressions below) by one. Note that the default of the count value is zero, and the count value is stored in the RAM of the controller 15. If a NO answer is obtained in step S3 meaning that the accelerator pedal 11 is not depressed, then the routine returns back to step S2.

The determination of whether the accelerator pedal 11 is depressed or not may alternatively be made using an accelerator switch which is to be turned on in response to depression of the accelerator pedal 11.

If a YES answer is obtained in step S3, then the routine proceeds to step S4 wherein it is determined whether the number of depressions of the accelerator pedal 11 is greater than or equal to a given value or not. The number of depressions of the accelerator pedal 11 is, as described above, derived from the count value stored in the RAM. The given value may be changed by the controller 15 and is set to, for example, three. The controller 15 may alternatively determines in step S4 whether the accelerator pedal 11 is kept depressed for a given period of time or more.

If a YES answer is obtained in step S4 meaning that the number of depressions of the accelerator pedal 11 is greater than or equal to the given value, then the routine proceeds to step S5. Alternatively, if a NO answer is obtained, then the routine returns back to step S2.

In step S5, a message that the locking of the accelerator pedal 11, as developed by the lock mechanism 13, is to be released is indicated on the display 4 and/or outputted from the audio output device 5 to inform the driver that the accelerator pedal 11 needs to be unlocked. This information may be given to the driver by actuating the vibrator 16 installed in the steering wheel or the driver's seat. The controller 15, the display 4, the audio output device 5, and/or the vibrator 16 function as an announcing device to announce the need for unlocking the accelerator pedal 11. The controller 15 resets the count value indicating the number of depressions of the accelerator pedal 11 to zero. The routine then returns back to step S2.

The display 4 and/or the audio output device 5 may also produce an additional guidance message about the location of or how to use the accelerator enabling unit 14.

If a YES answer is obtained in step S2 meaning that the accelerator enabling unit 14 is turned on, then the routine proceeds to step S6 wherein the locking of the accelerator pedal 11, as achieved by the lock mechanism 13, is released. Specifically, the controller 15 turns on the solenoid actuator to withdraw the rock pin disposed behind the accelerator pedal 11, thereby unlocking the accelerator pedal 11. The controller 15 may give the driver a message that the accelerator pedal 11 has been unlocked through the display 4 or the audio output device 5. The message may also be delivered to the driver by actuating the vibrator 16 installed in the steering wheel or the driver's seat or turning on an LED indicator mounted on an operating panel of the accelerator enabling unit 14. The unlocking of the accelerator pedal 11 may be made by the controller 15 only when the brake pedal 9 is found by the brake switch 10 as being depressed.

After step S6, the routine proceeds to step S7 wherein it is determined whether a given event has occurred or not. For instance, it is determined whether the system vehicle is kept stopped or parked over a common period of time for which the system vehicle usually waits for the traffic light to change or not.

The controller 15 may conclude that the given event has occurred when the off-signal indicating that the main switch 6 is in the off-state, so that the motor 3 is stopped and not yet ready to start is inputted to the controller 15. The controller 15 functions as a detector to detect whether the system vehicle is stopped or parked.

The controller 15 may alternatively conclude in step S7 that the given event has occurred when the signal indicating that the automatic transmission 250 is in the P-position or the N-position is kept inputted from the shift position sensor 8 to the controller 15 over a given period of time (e.g., one minute) which may be changed by the controller 15.

The controller 15 may also conclude in step S7 that the given event has occurred when the signal indicating that the driver is sitting on the seat is not inputted to the controller 15 from the seat sensor 7.

If a YES answer is obtained in step S7, then the routine proceeds to step S8. Alternatively, if a NO answer is obtained in step S7, then the routine repeats step S7.

In step S8, the lock mechanism 13 is actuated to lock or limit the depressed stroke of the accelerator pedal 11 again. The routine then returns back to step S2. Specifically, the controller 15 outputs the on-signal to the solenoid-operated actuator to extend the rock pin to limit the stroke of the accelerator pedal 11 and then turns off the accelerator enabling unit 14 through an actuator.

The operations of the start control system 100 will be demonstrated below with reference to FIG. 5.

The vehicle condition "locked, parked with no occupant", as indicated by "A1", represents the system vehicle which is parked and locked and in which occupants are not present. Consequently, the main switch 6 is turned off. The automatic transmission 250 is in the P-position where the gear shifter 200 (i.e., the shift stick) is locked. This locking is usually to hold the gear shifter 200 from being shifted from the P-position or the N-position unless the brake pedal 9 is depressed. The accelerator pedal 11 is locked by the lock mechanism 13.

When an authorized person unlocks and get in the empty system vehicle, the vehicle condition "unlocked, parked with occupant", as indicated by "B1", is entered. The main switch 6 is in the off-state. The accelerator pedal 11 is locked. The automatic transmission 250 is locked in the P-position or the N-position. When the person gets out of the system vehicle and locks it, the system vehicle is returned to the vehicle condition "locked, parked with no occupant".

When the authorized person or driver turns on the main switch 6 in the vehicle condition "unlocked, parked with occupant", the vehicle condition "ready-to-start-motor", as indicated by "C1", is entered. This condition is to set the motor 3 ready to run. Like in the vehicle condition "unlocked, parked with occupant", the accelerator pedal 11 is locked. The automatic transmission 250 is locked in the P-position or the N-position. The main switch 6 is, however, in the on-state.

When the accelerator enabling unit 14 is turned on while the brake pedal 9 is kept depressed in the vehicle condition "ready-to-start-motor", the system vehicle is placed in the vehicle condition "unlocked accelerator pedal", as indicated by "D". The locking of the accelerator pedal 11, as established by the lock mechanism 13, is released. Like in the vehicle condition "ready-to-start-motor", the main switch 6 is in the on-state. The automatic transmission 250 is locked in the P-position or the N-position. The accelerator pedal 11 is, however, in the unlocked state.

When the accelerator pedal 11 is in the unlocked state, and the controller 15 detects the given event, as discussed in step S7 of FIG. 4, the controller 15 actuates the lock mechanism 13 to limit the depressed stroke of the accelerator pedal 11 again. The system vehicle is returned back to the vehicle condition "ready-to-start-motor".

When the automatic transmission 250 is shifted from the P-position or the N-position to either of the D-position or the R-position while the brake pedal 9 is kept depressed, the vehicle condition "stopped", as indicated by "E", is entered. Like in the vehicle condition "unlocked accelerator pedal", the main switch 6 is in the on-state. The accelerator pedal 11 is in the unlocked state. The automatic transmission 250 is, however, placed in the D-position or the R-position.

When the automatic transmission 250 is shifted from the D-position or the R-position to either of the P-position or the N-position while the brake pedal 9 is depressed in the vehicle condition "stopped", the system vehicle is returned back to the vehicle condition "unlocked accelerator pedal".

When the accelerator pedal 11 is depressed by the driver in the vehicle condition "stopped", the system vehicle is brought into the vehicle condition "running", as indicated by "F1". Specifically, the system vehicle is running. Like in the vehicle condition "stopped", the main switch 6 is in the on-state. The accelerator pedal 11 is in the unlocked state. The automatic transmission 250 is placed in the D-position or the R-position.

In the vehicle condition "running", the system vehicle is accelerated as a function of the amount of depressed stroke or position of the accelerator pedal 11. When the brake pedal 9 is depressed, the system vehicle is brought into the vehicle condition "braking", as indicated by "G1". Specifically, the system vehicle is decelerated as a function of the amount of depressed stroke or position of the brake pedal 9. This braking may be achieved using brake pads or by a regenerative braking system. Like in the vehicle condition "running", the main switch 6 is in the on-state. The accelerator pedal 11 is in the unlocked state. The automatic transmission 250 is placed in the D-position or the R-position. When the accelerator pedal 11 is depressed, the system vehicle is returned back to the vehicle condition "running". When the braked pedal 9 is kept depressed, so that the speed of the system vehicle drops to zero, the system vehicle is placed in the vehicle condition "stopped".

Figure 5:
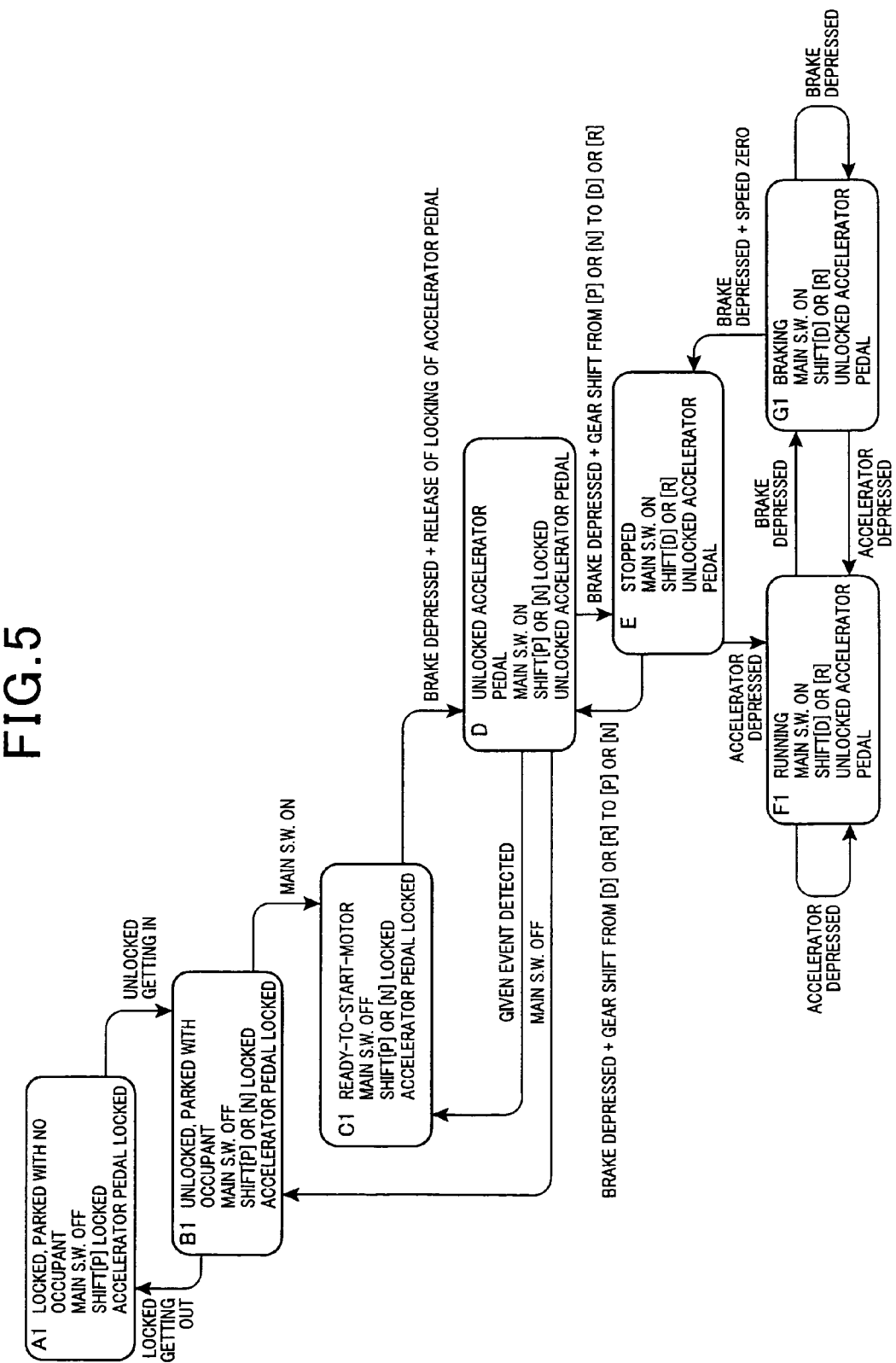
FIG. 5 is a view which shows operations of the start control system of FIG. 1 to control a starting operation of an electrically-driven vehicle with a transmission.

In the case where the start control system 100 is used with the two-wheeled electric vehicle, the vehicle experiences the same vehicle conditions as described in FIG. 5. In the case where the start control system 100 is used with an electric vehicle equipped with a manual transmission 250, the vehicle experiences the same vehicle conditions as described in FIG. 5 except that the driver needs to operate the clutch when the gear ratio of the transmission 250 is changed.

The operations of the start control system 100 when installed in a two-wheeled electric vehicle with no transmission (which will also be referred to as the system vehicle below) will be demonstrated below with reference to FIG. 6.

The system vehicle experiences the same vehicle conditions as described in FIG. 5 except that there is no need for shifting the gear of the transmission 250. Specifically, the vehicle condition "locked, parked with no occupant", as indicated by "A2" in FIG. 6, is the same as the vehicle condition "A1" in FIG. 5 except that the system vehicle does not need to lock the transmission 250 in the P-position. The vehicle condition "unlocked, parked with occupant", as indicated by "B2" in FIG. 6, is the same as the vehicle condition "B1" in FIG. 5 except that the system vehicle does not need to lock the transmission 250 in the P-position or the N-position. The vehicle condition "ready-to-start-motor", as indicated by "C2" in FIG. 6, is the same as the vehicle condition "C1" in FIG. 5 except that the system vehicle does not need to lock the transmission 250 in the P-position or the N-position.

Figure 6:
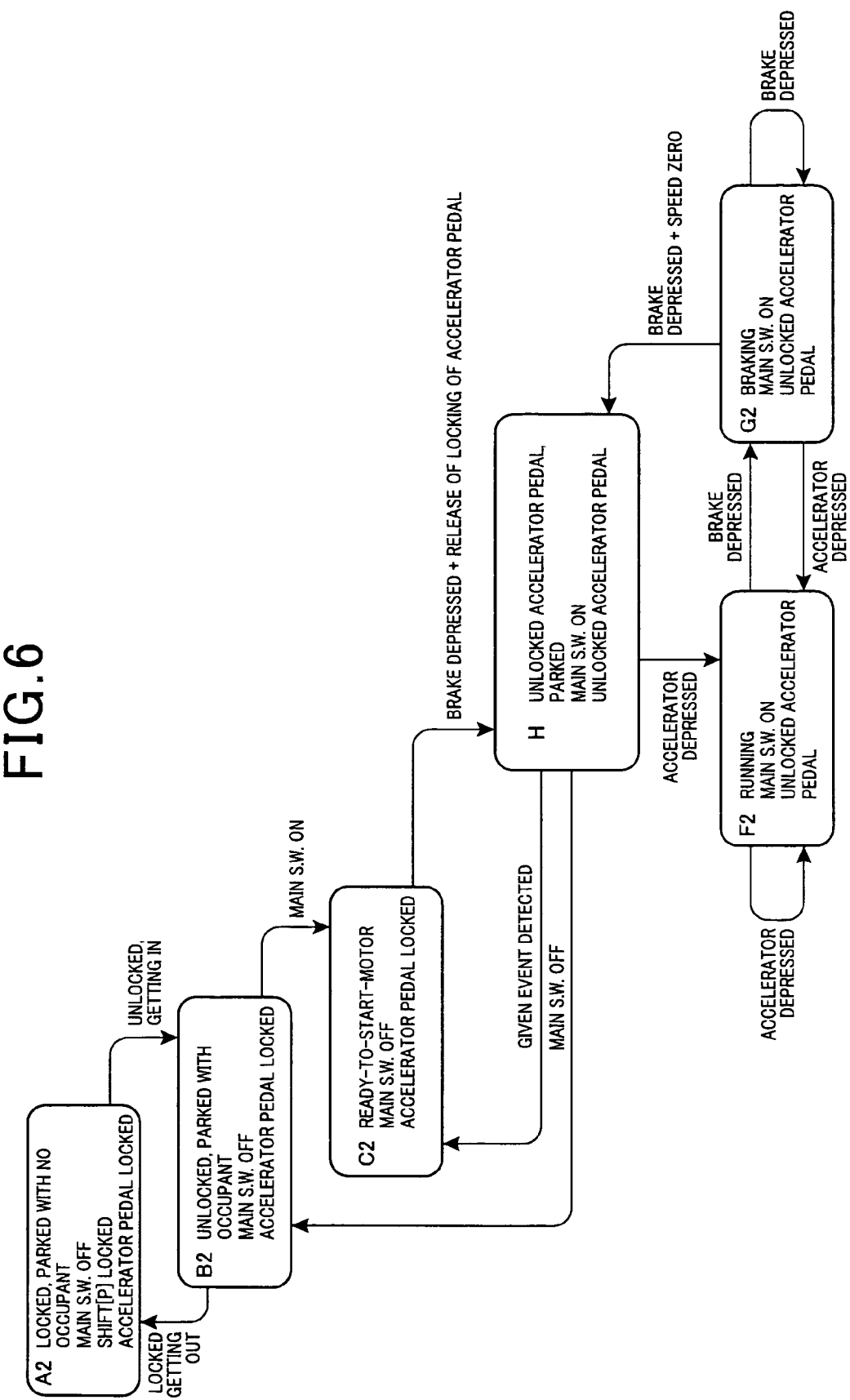
FIG. 6 is a view which shows operations of the start control system of FIG. 1 to control a starting operation of a two-wheeled electric vehicle with no transmission.

The vehicle condition "unlocked accelerator pedal, parked", as indicated by "H" in FIG. 6, is the same as a combination of the vehicle conditions "D" and "E" in FIG. 5 except that the system vehicle does not need to lock the transmission 250 in the P-position, the N-position, the D-position, or the R-position. The vehicle condition "running", as indicated by "F2" in FIG. 6, is the same as the vehicle condition "F1" in FIG. 5 except that the system vehicle does not need to set the transmission 250 in the D-position or the R-position. The vehicle condition "braking", as indicated by "G2" in FIG. 6, is the same as the vehicle condition "G1" in FIG. 5 except that the system vehicle does not need to set the transmission 250 in the D-position or the R-position.

As apparent from the above discussion, the start control system 100 inhibits the system vehicle from starting unless the accelerator enabling unit 14 is turned on to unlock the accelerator pedal 11.

The accelerator enabling unit 14, the main switch 6, and the brake pedal 9 are disposed at different locations, thus avoiding an undesirable starting of the system vehicle when the driver turns on the main switch 6 mistakenly, so that the condition where the motor 3 is set ready to start coincides with the condition where the brake pedal 9 is not depressed, unless the accelerator enabling unit 14 is turned on.

The start control system 100 keeps the accelerator pedal 11 locked by the lock mechanism 13 to disable the starting of the system vehicle unless the driver turns on the accelerator enabling unit 14 with the intention to start the system vehicle. In other words, the start control system 100 makes the driver easily know whether the system vehicle is ready to start or not.

When the accelerator pedal 11 is locked automatically by the lock mechanism 13 again without being found by the driver, the driver will be informed of the need for unlocking the accelerator pedal 11 at the time when the driver has depressed the accelerator pedal 11 several times and then enabled to get the system vehicle ready to start.

The start control system 100 releases the locking of the accelerator pedal 11, as established by the lock mechanism 13, when the controller 15 detects the depression of the brake pedal 9 through the output from the brake switch 10, and finds the accelerator enabling unit 14 to be turned on, but may alternatively be designed to unlock the accelerator pedal 11 only when the accelerator enabling unit 14 is found to be turned on.

The start control system 100 outputs the electric signal to the lock mechanism 13 through the controller 15 to unlock the accelerator pedal 11 when the accelerator enabling unit 14 is turned on, but may alternatively be engineered to join the accelerator enabling unit 14 and the lock mechanism 13 together through a single piece of wire or an assembly of wire and a transmitting member such as a crank so that the lock mechanism 13 will be actuated automatically in response to the operation on the accelerator enabling unit 14.

The accelerator enabling unit 14 serving as the limitation cancelling request receiver which receives a limitation canceling request from the driver to cancel the limitation of the operating range of the accelerator pedal 11, as achieved by the lock mechanism 13, the main switch 6 serving as the start request receiver to accept a request, as made by the driver, to start the electric motor 3, the brake pedal 3, and the accelerator pedal 11 are, as described above, provided to be separate from each other and preferably disposed at different locations which make it impossible for the driver to operate them simultaneously using one hand or one foot.

The accelerator enabling unit 14, the main switch 6, the brake pedal 3, the accelerator pedal 11, and the gear shifter 200 may also be disposed at different locations which make the driver impossible to operate them simultaneously using one hand or one foot. This minimizes the possibility that the driver turns on the accelerator enabling unit 14 in error while the main switch 6, the brake pedal 3, the accelerator pedal 11, and/or the gear shifter 200 are being operated.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A start control apparatus for an electrically-driven vehicle equipped with an electric motor working as a drive source of the vehicle, a brake working to brake the vehicle in response to a brake request from a vehicle operator, an accelerator which is to be moved in response to an acceleration request from the vehicle operator to accelerate the vehicle, and a motor driver working to drive the electric motor as a function of movement of the accelerator, comprising:
   a start request receiver that receives a start request from the vehicle operator to start the electric motor;
   an accelerator limiter which limits an operating range in which the accelerator is to be moved by the vehicle operator to disable the electric motor through the motor driver;
   a limitation cancelling request receiver that receives a limitation cancelling request from the vehicle operator; and
   a controller that is responsive to the start request, as received by the start request receiver, to make the electric motor ready to start, the controller being also responsive to the limitation cancelling request, as received by the limitation cancelling request receiver, to cancel limitation of the operating range of the accelerator, as established by the accelerator limiter, to enable the accelerator to be moved in response to the acceleration request from the vehicle operator,
   wherein the limitation cancelling request receiver, the start request receiver, the brake, and the accelerator are provided to be separate from each other and disposed at different locations which make it impossible for the vehicle operator to operate the limitation cancelling request receiver, the start request receiver, the brake, and the accelerator simultaneously using one hand or one foot, and
   wherein even when the electric motor is ready to start, the controller is inhibited from canceling the limitation of the operating range of the accelerator unless the limitation cancelling request receiver receives the limitation cancelling request from the vehicle operator.

2. A start control apparatus as set forth in claim 1, wherein the electrically-driven vehicle is equipped with a gear shifter which is operated manually by the vehicle operator to shift a gear ratio of the electrically-driven vehicle, and wherein the limitation cancelling request receiver, the start request receiver, the brake, the accelerator, and the gear shifter are provided to be separate from each other and disposed at different locations which make it impossible for the vehicle operator to operate the limitation cancelling request receiver, the start request receiver, the brake, the accelerator, and the gear shifter simultaneously using one hand or one foot.

3. A start control apparatus as set forth in claim 1, wherein when a given event is detected after the limitation of the operating range of the accelerator, as established by the accelerator limiter, is cancelled, the controller limits the operating range of the accelerator again through the accelerator limiter.

4. A start control apparatus as set forth in claim 3, wherein the electrically-driven vehicle is equipped with a gear shifter which is operated manually by the vehicle operator to shift a gear ratio of a transmission mounted in the electrically-driven vehicle, further comprising a shift position sensor which senses a position of the gear shifter, and wherein when the position of the gear shifter, as sensed by the shift position sensor, is kept in one of a parking position and a neutral position for a given period of time, the controller determines that the given event has been detected and then limits the operating range of the accelerator again through the accelerator limiter.

5. A start control apparatus as set forth in claim 3, further comprising a seat sensor which senses the vehicle operator on an operator's seat of the electrically-driven vehicle, and wherein when the vehicle operator is determined by the seat sensor as not being sitting on the operator's seat, the controller determines that the given event has been detected and then limits the operating range of the accelerator again through the accelerator limiter.

6. A start control apparatus as set forth in claim 3, wherein when it is found that the electric motor is stopped and not ready to start, the controller determines that the given event has been detected and then limits the operating range of the accelerator again through the accelerator limiter.

7. A start control apparatus as set forth in claim 1, wherein the accelerator is so designed that when moved by the vehicle operator over a given amount, the accelerator works to accelerate the electric motor, and wherein the accelerator limiter mechanically holds the accelerator from being moved over the given amount.

8. A start control apparatus as set forth in claim 7, further comprising an accelerator sensor which sensors the movement of the accelerator and produces an output indicative thereof, wherein the controller monitors the output from the accelerator sensor to determine whether the accelerator has been moved a given number of times or for a given period of time or more, and wherein when it is determined that the accelerator has been moved the given number of times or for the given period of time or more, the controller informs the vehicle operator that the limitation of the operating range of the accelerator, as achieved by the accelerator limiter, needs to be cancelled through an announcing device.

9. A start control apparatus as set forth in claim 1, further comprising a brake sensor which senses an operation of the brake, wherein when it is found by the brake sensor that the brake is being operated, and the limitation cancelling request receiver receives the limitation cancelling request, the controller cancels the limitation of the operating range of the accelerator, as established by the accelerator limiter.

* * * * *